Feb. 1, 1927. 1,616,142
W. ROTTER ET AL
SPRING MOTOR
Filed Sept. 9, 1921 5 Sheets-Sheet 1

Fig.1

INVENTORS.
WILLIAM ROTTER AND
BY ERWIN J. PANISH
Everett & Rook, ATTORNEYS.

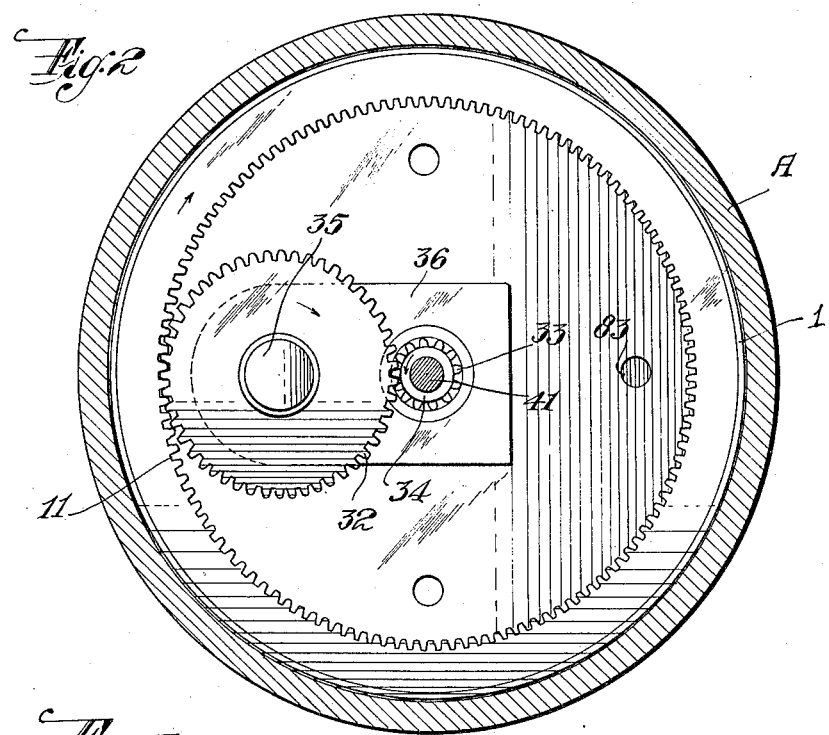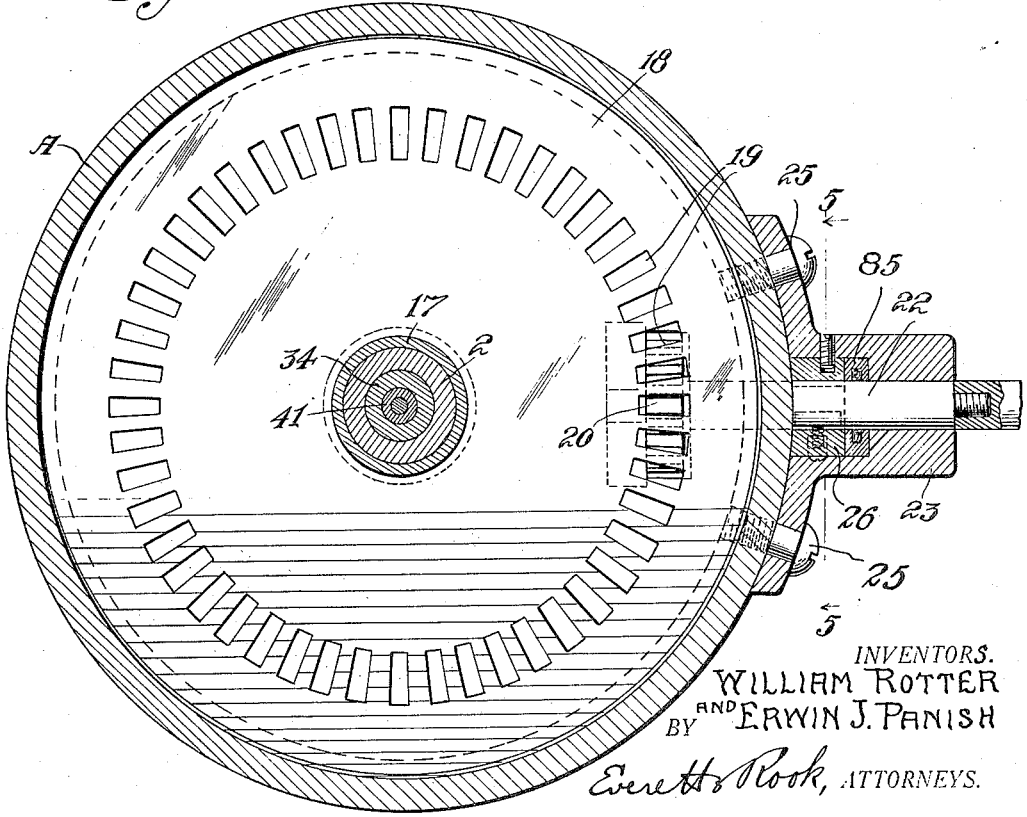

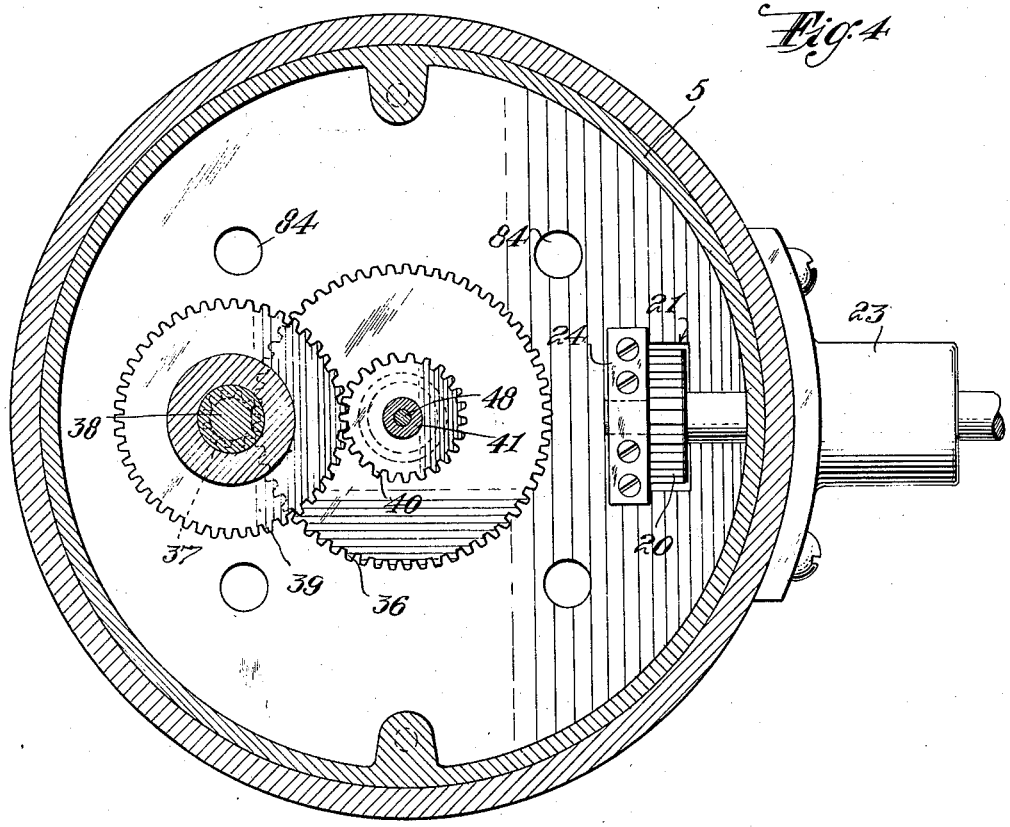
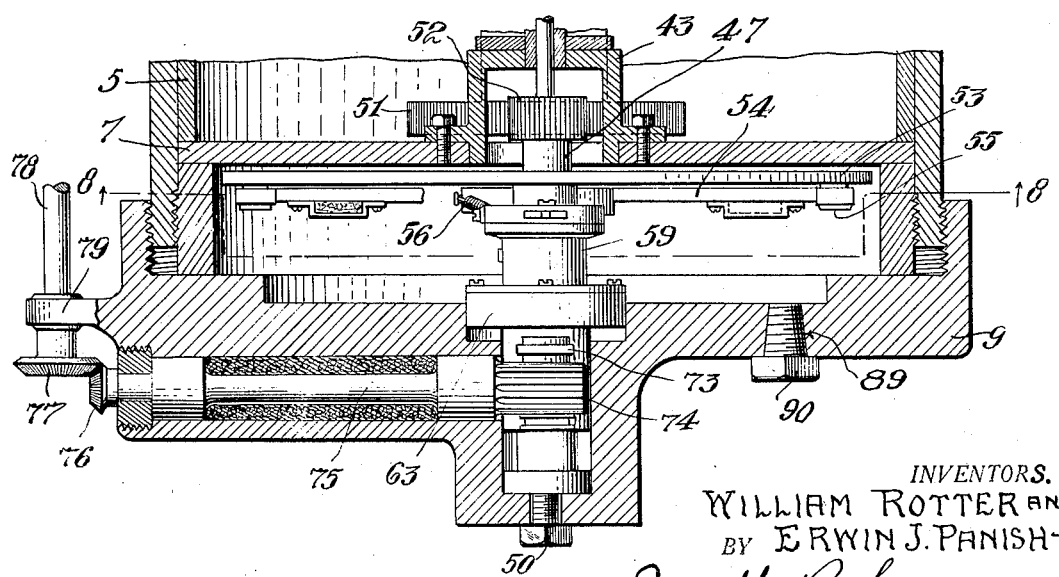

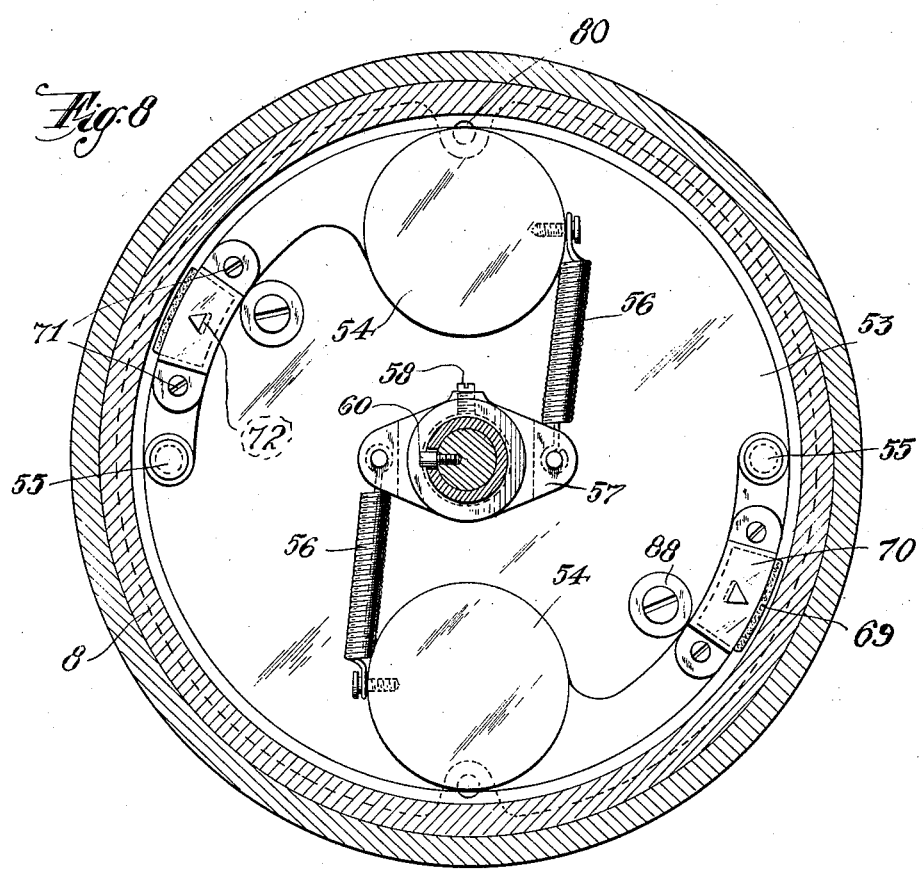
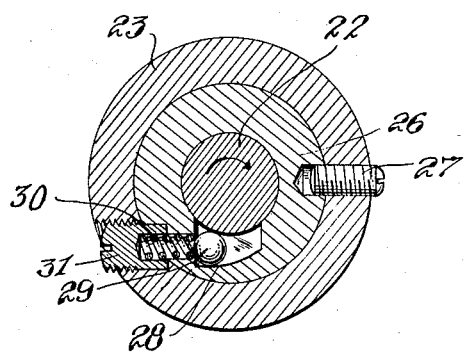
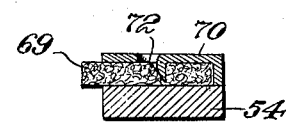

Feb. 1, 1927.
W. ROTTER ET AL
1,616,142
SPRING MOTOR
Filed Sept. 9, 1921    5 Sheets-Sheet 5
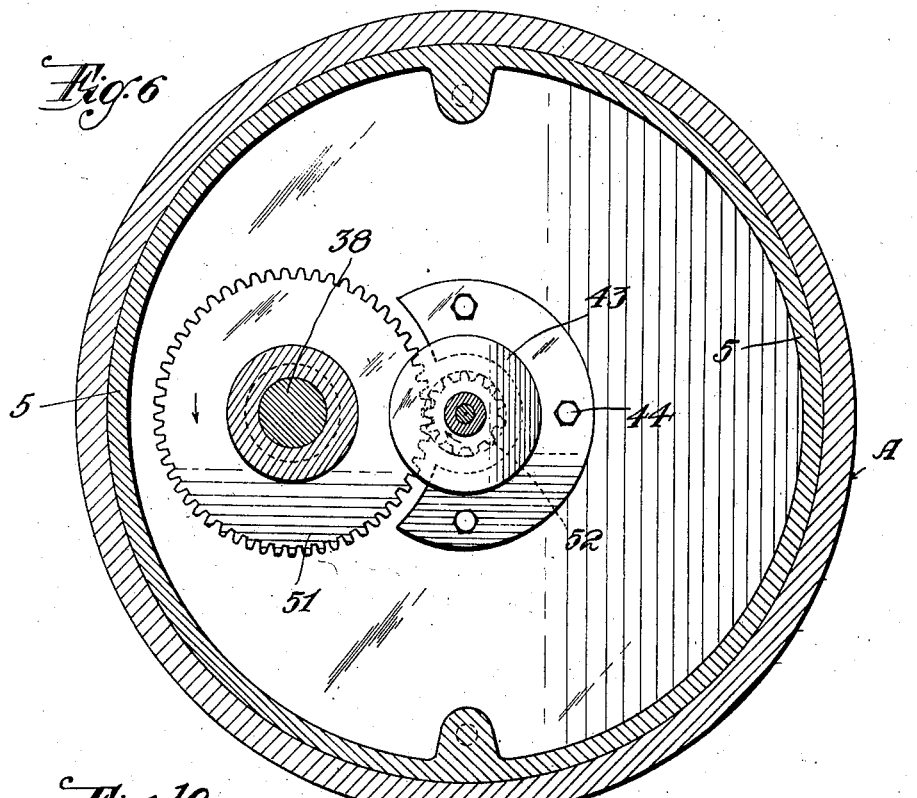
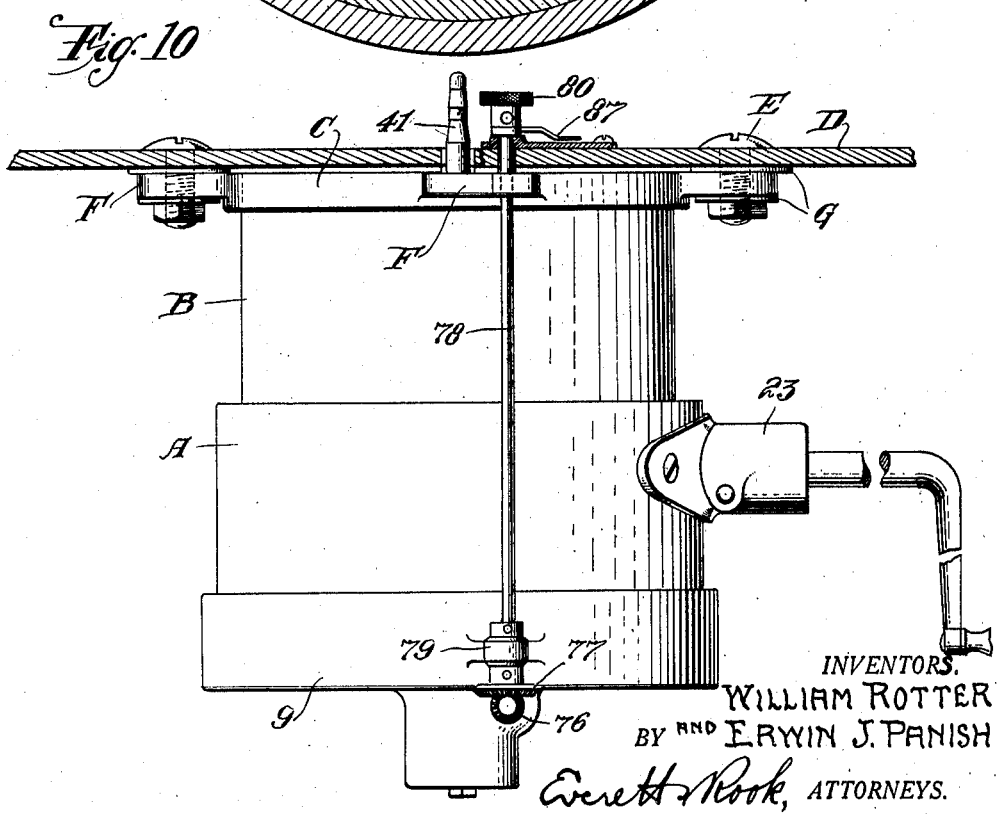
INVENTORS.
WILLIAM ROTTER
BY AND ERWIN J. PANISH
Everett Rook, ATTORNEYS.

Patented Feb. 1, 1927.                                            1,616,142

UNITED STATES PATENT OFFICE.

WILLIAM ROTTER, OF NEW YORK, AND ERWIN J. PANISH, OF BROOKLYN, NEW YORK; SAID PANISH ASSIGNOR TO SAID ROTTER.

SPRING MOTOR.

Application filed September 9, 1921. Serial No. 499,457.

This invention relates in general to spring motors and more particularly to motors for sound reproducing machines, one object of the invention being to provide a motor of this character having the moving parts thereof arranged in a telescoping and longitudinally alined relation and enclosed in a short cylindrical casing or housing thereby preventing dust accumulation and retaining the oil and grease around the moving parts, whereby the motor consumes a minimum amount of space, runs smoothly and substantially noiseless and ensures a minimum amount of wear of the moving parts and bearings.

Other objects of the invention are to provide an improved extremely sensitive governor for spring motors whereby the speed of rotation of the motor shaft may be finely and accurately adjusted and varied to the desired number of revolutions per minute, and to provide such a governor which is simple in construction and reliable in operation.

Further objects of the invention are to provide a motor of the character described having the rotating parts arranged in vertical position and journaled in thrust bearings so as to reduce friction and lateral strain on the bearings and parts and thereby reduce wear, looseness and consequent noise and lack of adjustment of engaging parts; to provide a motor having improved and substantially noiseless gearing, which can be easily and quickly assembled and taken apart; to provide a spring motor having an improved spring mounting; to provide a novel, reliable and easily operable spring winding mechanism; to provide a centrifugal governor having spring restrained weight members adapted to frictionally engage a bearing surface, and improved means for controlling the extent and time of said frictional engagement; to thus provide novel means for adjusting the tension of the springs restraining said weight members to place more or less restraint on the outward swinging of said weight members; to provide a governor comprising a revoluble disk having a plurality of weight members pivotally mounted on one side thereof, and an adjusting member axially mounted with respect to said disk rotatable with and relatively to said disk with springs connected between said weight members and said adjusting member, whereby relative rotation of said adjusting member and said disk varies the tension of said springs; to provide novel means for producing said relative rotation of the disk and adjusting member; and to obtain other results and advantages as may be brought out by the following description.

Referring to the accompanying drawings, in which like numerals of reference indicate the same parts throughout the several views, Figure 1 is a vertical longitudinal sectional view through a motor constructed in accordance with my invention;

Figure 2 is a horizontal sectional view taken on the line 2—2 of Figure 1;

Figure 3 is a view similar to Figure 2 taken on the line 3—3 of Figure 1;

Figure 4 is a horizontal sectional view taken on the line 4—4 of Figure 1;

Figure 5 is a transverse sectional view through the spring winding shaft clutch for preventing backward rotation of the shaft, taken on line 5—5 of Figure 3;

Figure 6 is a horizontal sectional view through the motor taken on the line 6—6 of Figure 1;

Figure 7 is a fragmentary transverse sectional view taken through the lower portion of the motor and viewing the same from the position at right angles to that shown in Figure 1;

Figure 8 is a horizontal sectional view taken on the line 8—8 of Figure 7;

Figure 9 is a transverse sectional view through one of the governor weight members showing the manner of attaching the felt friction members thereto, and Figure 10 is a side elevation of the motor on a reduced scale showing the same secured to a motor board or support of a cabinet.

In the embodiment of my invention shown on the drawings, the reference character A designates a cylindrical housing for the motor having an axially reduced portion B which is closed at its outer end by a cover C, the said housing being adapted to be secured in a substantially vertical position to a motor board or support D of a cabinet (see Figure 10), by means of bolts E passing through radial lugs F on the cover C and the motor board D, the vibration insulating washers G being interposed between the motor board D and the cover and between the bolts E and the lugs F.

A spring casing 1 is located in the reduced portion B of the housing and is supported upon a tubular post 2 coaxial with the housing and rigidly secured at one end thereof to the base 4 of a gear casing 5 fixedly mounted in the lower portion of the housing and held in properly spaced relation with the spring casing 1 by means of a shoulder 6 in the housing. The lower end of the gear casing 5 is closed by a cover 7 secured against rotation on the casing by means of positioning pins 8 secured in the casing and passing through openings in the closure plate 7, and the gear casing 5 is secured within the housing A by means of a friction ring 8 screwed into the lower end of the housing tightly against the closure plate 7. The friction ring 8 cooperates with a governor mounted in the housing A between the closure plate 7 and a base cover 9 screwed onto the lower end of the casing.

The spring casing 1 has secured in the upper end thereof a cover plate 10 and an internal gear 11, and the lower end of the spring casing is closed by a plate 12 removably secured in the casing by a split spring ring 13. A spiral spring 14 is mounted within the spring casing 1 and has one end thereof secured to the said casing by means of a stud 15, the opposite end of the spring being secured by means of a stud 16 to a sleeve 17 revolubly mounted on the post 2 and having one end thereof passing through an opening 180 in the top plate 10 of the spring casing and the lower end thereof riveted or otherwise securely fastened to a winding plate 18 arranged in the housing between the spring casing and the gear casing 5.

The spring winding plate 18, (see Figure 3) is provided with an annular series of openings 19 adapted to be engaged by the teeth of a winding pinion 20 passing through a slot 21 in the base of the gear casing 5 and formed with a shaft 22 passing outwardly through the housing A and a bracket 23, the outer end of said shaft being journaled in the bracket 23 and the inner end thereof being journaled in a bearing 24 secured to the base of the gear casing 5. The bracket 23 is secured to the housing A by means of screws 25 which pass into the gear casing 5 and serve to prevent rotation thereof, and the said bracket is provided with a bushing 26 secured against rotation in the bracket by means of a set-screw 27, the said bushing being provided with a cam recess 28 having a roller 29 therein and normally forced toward the small end of the recess 28 by means of a spring 30 carried by a screw 31 mounted in the bracket. The cam recess 28 is so arranged that as the shaft 22 is rotated in a clockwise direction the roller 29 is forced away from the shaft 22 by the rotation of the shaft, but as the shaft starts rotating backwardly the spring 30 forces the roller 29 into the small end of the recess 28 so that it becomes jammed between the wall of the recess and the shaft, thereby holding the shaft against backward rotation. It will be seen that as the shaft 22 is rotated in a clockwise direction the pinion will engage the openings 19 in the winding plate 18 to produce revolution of the sleeve 17 so as to wind the spring 14.

An idler gear 32 meshes with the internal gear 11 and a pinion 33 on a tubular shaft 34 mounted within the post 2, the said idler being journaled by a stud 35 on a bracket support 36 screwed onto the upper end of the post 2 above the top plate 10 of the spring casing 1. The tubular shaft 34 projects through the base of the gear casing 5 and has pinned on the inner end thereof a gear 360 which meshes with a pinion 37 formed on a shaft 38 journaled between the base and the closure plate 7 of the gear casing 5. The shaft 38 has rigidly mounted thereon a gear 39 which meshes with a pinion 40 on the inner end of the turn-table shaft 41 which is mounted within the tubular shaft 34 and the inner end of which is journaled on a thrust bearing 42 supported by a bridge 43 secured by bolts 44 to the inside of the closure plate 7 of the gear casing. The inner end of the tubular shaft 34 has a thrust bearing on the boss 400 formed on the turn-table shaft 41 above the pinion 40. With this construction it will be observed that as the spring 14 unwinds the spring casing 1 and internal gear 11 will be revolved transmitting motion through the idler 32 to the pinion 33 and shaft 34. The shaft 34 transmits this motion through the gear 360, pinion 37 and gear 39 to the pinion 40 on the inner end of the turn-table shaft 41 so as to rotate the turn-table shaft, and the ratio of the said respective gears is such that a proper speed of revolution of the turn-table shaft is ensured. The outer end of the turn-table shaft 41 is journaled in a bushing 45 mounted in an inside cover plate 46' of the housing A, the said turn-table shaft passing outwardly through the cover C and being adapted to receive a suitable turn-table, (not shown).

The closure plate 7 of the gear casing 5 is formed with an axial opening 46 through which passes a governor shaft 47 coaxial with the housing A, the upper end 48 of the governor shaft being journaled within the inner end of the turn-table shaft 41 and the lower end of said shaft 47 being mounted on a ball thrust bearing 48 within a bushing 49, which bearing is adjustable by a screw 50. A gear 51 rigidly mounted on the pinion shaft 38 meshes with a pinion 52 secured on the governor shaft 47 for driving the same. A governor disk 53 is rigidly mounted axially on the shaft 47 within the friction ring 8, and a pair of weight members 54 are pivotally mounted at diametrically opposite points on one side of said disk, as at 55, the swinging ends of said governor weight members being enlarged and connected by tension springs 56 to opposite sides of a yoke 57 secured fast as by means of a set screw 58 to a sleeve 59 slidably and rotatably mounted on the governor shaft 47. The shaft 47 is formed with a radial pin or stud 60 which projects outwardly through a spiral slot 61 formed in the sleeve 59. The lower end of the sleeve 59 is provided with an annular flange 62 received within an adjusting collar 63 mounted in an axial recess 64 in the base cover 9, the said adjusting collar 63 having a reduced sleeve portion 65 slidable in a recess 66 in the base cover 9 in which is also mounted the bearing bushing 49. The upper edge of the adjusting collar 63 has detachably secured thereto a ring 67 which overlies the flange 62 of the sleeve 59, and a bearing ring 68, preferably formed of bakelite, is interposed between the said flange 62 and the ring 67. The governor weight members are provided with felt bearing members 69 which are preferably secured to the undersides of the weight members by means of clips 70 adapted to receive the felt members 69 between themselves and the weight members, the ends of said clips being secured to the weight members by screws 71. The clips are also preferably formed with prongs 72 which penetrate the felt members to prevent the same from slipping from beneath the said clips. The felt members are arranged on the outer sides of the weight members 54, and the weight members are normally held in spaced relation with the bearing ring 8 by means of the spring 56. When the governor disk 53 is rotated through the gear 51 and pinion 52 the weight members are swung outwardly by centrifugal action about their pivots 55 toward the bearing ring 8 and the felt members 69 frictionally engage the bearing ring so as to serve as brakes to limit the speed of rotation of the governor shaft.

For the purpose of regulating the speed of rotation of the turn-table shaft 41 we have provided means for rotating the sleeve 59 relatively to the shaft 47 to adjust the tension of the springs 56. Thus one side of the sleeve portion 65 of the speed adjusting collar 63 is formed with a rack 73 which meshes with a pinion 74 carried by a horizontal shaft 75 journaled in the bottom cover 9. The outer end of the shaft 75 is provided with a small bevel pinion 76 which meshes with a larger bevel gear 77 mounted on a vertical shaft 78 journaled in bearing lugs 79 and F on the bottom cover 9 and top cover C. The shafts 78 projects upwardly beside the housing A, passes through the motor board D and is provided at its upper end with a thumb nut 80 by means of which the shaft may be rotated. It will thus be observed that when the shaft is rotated by the thumb nut 80 the pinion 74 meshing with the rack 73 will cause a vertical sliding of the speed adjusting collar 63. This motion in turn causes a movement of the sleeve 59 longitudinally of the governor shaft 47, and the spiral slot 61 in the said sleeve engaging the pin 60 on the shaft causes a rotation of the sleeve 59 relative to the governor shaft and a corresponding rotation of the yoke 57. Rotation of the said yoke in one direction decreases the tension of the springs 56 while rotation of the yoke in the opposite direction increases the tension of the springs. Thus, to increase the speed of rotation of the turn-table shaft 41 the tension of the springs would be increased to restrain the outward swinging of the weight members 54, while to decrease the speed of rotation of the shaft 41 the tension of the springs would be decreased. To limit the inward movement of the governor weight members 54 cushion stops 88 may be secured to the disk 53 and serve as abutments to be engaged by the weight members 54. To indicate the speed of rotation of the turn-table shaft 41 the shaft 78 may be provided beneath the thumb nut 80 with a pointer 87 cooperating with a suitable dial. The bearing ring 68 affords a loose connection between the speed adjusting collar 63 and the flange 62 of the sleeve 59 so that the sleeve 59 may rotate independently of the speed adjusting collar 63, but is caused to move longitudinally with said collar.

With this construction it will be seen that all of the driving parts of the motor are entirely enclosed within the housing A so that dust accumulation is prevented and the grease and oil are retained around the moving parts as is necessary. The driving parts of the motor being arranged in substantially vertical position and in a telescoping relation with vertical thrust bearings, it will be seen that the motor will be substantially noiseless in operation and that a minimum amount of wear on the engaging parts and bearings is ensured. The cover C and inside cover plate 46' of the housing A are preferably formed with registering openings 81 for the purpose of applying oil to the motor, the said openings being closed by a suitable cap 82. The top plate 10 of the spring casing is also formed with openings 83 and the bottom plate 12 of the spring casing and the base of the gear casing 5 are formed with openings 84 so that the oil and grease may descend through the spring casing to the gears in the gear casing, it being understood that the oil will pass through the openings 19 in the spring winding plate 18. For the purpose of preventing oil from seeping out around the winding shaft 22, we may provide a collar 85 around said shaft provided with a felt ring 86 to absorb the oil. A drain opening 89 normally closed by a plug 90 is provided in the base cover 9 to drain oil and grease from the housing A, and this opening may also be used with the openings 81, 84, and 19 to clean the mechanism by pouring gasoline or the like through the openings 81 and allowing it to pass through the mechanism and out of said drain opening 89, without disassembling the motor.

While we have shown and described one possible embodiment of our invention it will be understood that this is for the purpose of illustrating the principles of the invention only and that many modifications and changes can be made in the detail structure of the motor without departing from the spirit or scope of the invention. Therefore, we do not wish to be understood as limiting ourselves except as required by the following claims when construed in the light of the prior art.

Having thus described the invention, what we claim is:—

1. In a spring motor, the combination of a spring barrel, a coaxial multiplying train, and a governor also coaxial with the spring barrel driven from said train.

2. In a spring motor, a casing, a governor therein, a spring barrel on the outside of the casing containing a driving spring, an internal gear driven thereby, and a central shaft having a pinion driven from said internal gear through an idler, said shaft extending into the casing and there having driving connections with the governor.

3. In a spring motor, a casing, a governor therein, a spring barrel outside of and coaxial with the casing, an internal gear on the spring barrel, a central hollow shaft driven from said internal gear and passing into the casing, and driving connections between said shaft and governor.

4. In a spring motor, the combination of a spring barrel, a driven shaft co-axial with said spring barrel, a driving connection between said spring barrel and said driven shaft, a governor shaft mounted co-axial with said driven shaft, weight members pivotally connected to said governor shaft and adapted to be swung outwardly at an angle to the axis of said shaft by centrifugal action, spring means for restraining the outward swinging of said weight members, and a continuous encircling surface around said governor shaft adapted to be engaged by said weight members.

5. In a spring motor, the combination of a spring barrel, a driven shaft co-axial with said spring barrel, a driving connection between said spring barrel and said driven shaft, a casing enclosing said spring barrel, a governor shaft having one end revolubly mounted co-axially within the end of said driven shaft and the other end journaled in said casing, a multiplying driving connection between said driven shaft and said governor shaft, weight members pivotally connected to said governor shaft to swing in a plane substantially at right angles to the axis of said governor shaft, and a continuous encircling surface around said governor shaft adapted to be engaged by said weight members.

6. In a spring motor, the combination of a substantially cylindrical vertical closed housing, a gear casing fixedly mounted co-axially within said housing and supported on the lower end of said casing, a co-axial tubular post fixedly mounted on the upper end of said gear casing, a tubular transmission shaft revoluble within said post, a revoluble spring barrel having a spring therein co-axial with and surrounding said tubular post, a driving connection between said spring and said transmission shaft, a driven shaft mounted within said transmission shaft and projecting outwardly through the upper end of said housing, a driving connection in said gear casing between said transmission shaft and said driven shaft, a governor shaft having one end revolubly mounted co-axially within the end of said driven shaft and the other end journaled in said casing, a multiplying driving connection between said driven shaft and said governor shaft, weight members pivotally connected to said governor shaft to swing in a plane substantially at right angles to the axis of said governor shaft, and a continuous encircling surface around said governor shaft adapted to be engaged by said weight members.

7. In a spring motor, the combination of a spring barrel enclosing a spring, a transmission shaft, a driving connection between said spring barrel and said transmission shaft, a driven shaft co-axially mounted within said transmission shaft, a driving connection between said transmission shaft and said driven shaft, a governor mechanism revoluble co-axially with said driven shaft, and a driving connection between said transmission shaft and said governor mechanism.

WILLIAM ROTTER.
ERWIN J. PANISH.